United States Patent [19]

Goetze et al.

[11] Patent Number: 4,839,970

[45] Date of Patent: Jun. 20, 1989

[54] FILLING COMPOUND FOR LIGHT WAVEGUIDE LEADS AND/OR LIGHT WAVEGUIDE CABLES

[75] Inventors: Werner Goetze, Berlin; Ernst Mayr, Starnberg; Ulrich Oestreich; Helmut Saller, both of Munich, all of Fed. Rep. of Germany

[73] Assignee: Siemens Aktiengesellschaft, Berlin and Munich, Fed. Rep. of Germany

[21] Appl. No.: 94,093

[22] Filed: Sep. 4, 1987

Related U.S. Application Data

[63] Continuation of Ser. No. 881,695, Jul. 3, 1986, abandoned.

[30] Foreign Application Priority Data

Jul. 5, 1985 [DE] Fed. Rep. of Germany ....... 3524181

[51] Int. Cl.$^4$ .......... G02B 6/44; H02G 15/00
[52] U.S. Cl. .............. 350/96.23; 106/287.1; 106/15.05; 523/173
[58] Field of Search ...... 106/287.1; 524/493; 350/96.3

[56] References Cited

U.S. PATENT DOCUMENTS

| | | | |
|---|---|---|---|
| 4,370,023 | 1/1983 | Lange et al. | 350/96.23 |
| 4,411,951 | 10/1983 | Barsotti | 524/493 |
| 4,497,918 | 2/1985 | Wason | 524/493 |
| 4,592,855 | 6/1986 | Gioffre et al. | 424/49 |
| 4,678,516 | 7/1987 | Alderman | 106/188 |
| 4,705,571 | 11/1987 | Lange | 106/287.1 |

FOREIGN PATENT DOCUMENTS

110294  9/1978  Japan ................................. 523/109

*Primary Examiner*—Theodore Morris

[57] ABSTRACT

A filling compound for a light waveguide lead and/or light waveguide cable. The filling compound comprises polypropylene glycol and a second constituent chosen from the group consisting of: finely distributed fumed silica; aluminum oxide; aluminum hydroxide; a halogen containing organic compound; and mixtures thereof. Preferably, the polypropylene glycol comprises 50 to 99 weight percent of the filling compound, and the second constituent comprises 1 to about 50 weight percent.

20 Claims, 1 Drawing Sheet

FILLING COMPOUND FOR LIGHT WAVEGUIDE LEADS AND/OR LIGHT WAVEGUIDE CABLES

This application is a continuation of Ser. No. 881,695 filed 07/03/86, now abandoned

BACKGROUND OF THE INVENTION

The present invention relates generally to optical cables. Specifically, the present invention relates to filling compounds for light waveguide leads and/or light waveguide cables that includes a thixotroping agent.

Typically, several light waveguides leads, for the transmission of optical signals or light waves, are disposed within a protective casing defining a light waveguide cable. Each light waveguide lead typically consists of a fiber that is coated and surrounded by a protective sheath. As disclosed in U.S. Pat. No. 4,331,379, the space between the protective casing and light waveguide lead can be filled with a filling compound. U.S. Pat. No. 4,331,379 discloses a filling compound that consist of thixotropic oils. Moreover, the space between the fibers of the light waveguide lead and the protective sheath can also be filled with a filling compound.

Prior filling compounds have not been entirely satisfactory. This is due, in part, to the fact that the requirements of the filling compounds are, in part, contradictory for light waveguide transmission elements. It is desireable for a filling compound to exhibit the following properties:

(a) The filling compound should be resistant to aging both in a chemical sense and in a physical sense, (b) The filling compound should be compatible with and not exhibit a detrimental effect on any of the materials the filling compound will contact, i.e. the protective casing, the coating on the fibers, or the protective sheath.

(c) The filling compound should exhibit an optimally low moisture absorption, (d) The filling compound must retain its properties over a wide temperature range, for example from $-40°$ C. to $+70°$ C.; accordingly the filling compound should not exhibit excessive hardness at low temperatures that will cause a mechanical stressing of the light waveguides due to an excessive increase in the viscosity nor should the filling compound exhibit a phase separation at high temperature and resultant drip-out of the filling compound from the cable, (e) the shearing strain characteristic of the filling compound is also important, shearing rate characteristic should be established without noticeable gradient, i.e. without excessively pronounced thixotropic behaviour; this is important for uniform lateral displacement of the light waveguide fibers given relative length changes between the protective sheath and the fiber, (f) the filling compound should avoid the build-up of tensile or compressive forces on the light waveguide leads to the greatest possible degree, the increase tensile on compressive force will cause the light waveguide leads to attenuate, (g) the filling compound should have a low viscosity at room temperature in its inprocessed condition in order to enable the filling of the cables and leads with the filling compound during the light waveguide manufacturing operation; even with cables and leads having a small inside diameter and at a slight excess pressure, and (h) the filling compound should have a transparency that is such that it allows for the filling compound to have a thickness of up to a few millimeters.

Typical known filling compounds are defficient in one or more of the above characteristics. Thus, there is a need for an improved filling compound for light waveguide leads and light waveguide cables.

SUMMARY OF THE INVENTION

The present invention provides a filling compound that exhibits the needed properties and is easy to process. The filling compound can be utilized to fill light waveguide leads or light waveguide cable cores. The filling compound comprises polypropylene glycol to which a second compound chosen from the group consisting of; aluminum hydroxide; aluminum oxide, a halogen containing organic compound; or mixtures thereof, is added as a thixotropic agent.

Preferably, the filling compound consists of between approximately 50 to about 99 weight percent of polypropylene glycol and between approximately 50 to about 1 weight percent of the second compound. In a preferred embodiment, the filling compound comprises between approximately 50 to about 99 weight percent of polyproylene glycol and approximately 50 and to about 1 weight percent of a finely distributed fumed silica that acts as a thixotroping agent.

Preferably, when utilized to fill a light waveguide lead, the composition comprises approximately 99 to about 96 weight percent polypropoylene glycol and approximately 4 to about 1 weight percent finely distributed fumed silica. Preferably, when utilized to fill a light waveguide cable the composition comprises approximately 92 to about 50 weight percent polypropylene glycol and approximately 50 to about 8 weight percent finely distributed fumed silica.

In a further preferred embodiment, the polypropylene glycol has an average molecular weight of between approximately 2000 to about 3500. In a further preferred embodiment, the filling compound includes an antioxidant. Preferably, the antioxidant is present in approximately 0.1 to about 1 weight percent of the filling compound.

In another preferred embodiment, the fumed silica is substituted for by aluminum hydroxide or aluminum oxide, in whole or in part. In another preferred embodiment, the fumed silica is substituted for by a bromine-containing compound.

DETAIL DESCRIPTION OF THE PRESENTLY PREFERRED EMBODIMENTS

Figure 1:
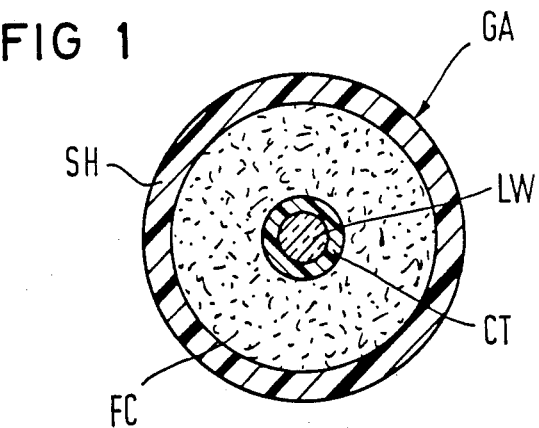
FIG. 1 illustrates a cross-sectional view of a filled light waveguide lead of the present invention.

The present invention provides a filling compound for light waveguide leads and cables. The filling compound is designed to fill the space or interstices between the fibers of the light waveguide leads and its protective sheath or between the light waveguide lead and protective casing of the light waveguide cable.

The filling compound of the present invention comprises between approximately 50 to about 99 weight percent polypropylene glycol and between approximately 50 to about 1 weight percent of a compound chosen from the group consisting of: fumed silica; aluminum hydroxide; a halogen containing compound; aluminum oxide; or mixtures thereof. The compound acts as a thixotroping agent. Preferably the fumed silica is finely distributed. As set forth below, the filling compound exhibits the required properties set forth above in the background of this invention.

By utilizing polypropylene glycol, many of the required properties of a filling compound are achieved. Polypropylene glycol is largely hydrophobic, it is compatible with typical materials used for coating the fibers and protecting the light waveguide lead, and affords a high chemical and physical resistance to aging. Accordingly, by using polypropylene glycol, the filling compound exhibits: a resistance to aging; a compatability with the materials it will contact i.e., the protective sheath and coating; and has a low moisture absorption.

Typically, polyurethane acrylate is employed as a fiber coating. Such coatings of polyurethane-acrylate are especially frequently employed in light waveguides because in addition to providing good protection to the fibers, they are easily applied. The polypropylene glycol and fumed silica filling compound does not exhibit any detrimental effect on polyurethane acrylate. Moreover, the materials that typically comprise the protective sheath and cable casing, which surrounds the coated light waveguides leads, are likewise not attacked by the filling compound of the present invention.

Polypropylene glycol is also advantageously used in view of its freezing point, which is below $-60°$ C. Accordingly, polypropylene glycol does not exhibit any undesireable hardening until temperatures well below $-40°$ C. are reached. Furthermore, the addition of finely distributed fumed silica (i.e., the size of the agglomerates are less than 10um) as a thixotroping agent to the polypropylene glycol provides the filling compound with the need filling compound requirements at warmer temperatures. To this end, the filling compound becomes drip-proof in minutes through hours at $+70°$ C. and in days at $+20°$ C. However, by slightly shearing the filling compound the flowability of the filling compound can be restored. Depending upon the heat applied, pseudo-regulation occurs quickly through very quickly. The process is arbitrarily reversible. However, the filling compound provides a falling shearing stress/shearing rate characteristic, that also unavoidably derives therefrom, but this proceeds from a low limit shearing stress, i.e. is only slightly falling.

Any length compensation events in the light waveguide leads proceeding uniformly over the length will not be detrimental to the light waveguide leads or cables because there will be no drastic reduction in the viscosity of the filling compound. Rather, only a moderate reduction of the viscosity of the filling compound will occur given adequately slow events. Only upon the application of a high shearing force does the viscosity of the filling compound fall to that of polypropylene glycol. However, such high shearing rates should not occur when the filling compound is used to fill light waveguide leads and cables, and accordingly, are not of a concern for use of the filling compound in light waveguide cables or light waveguide leads.

The filling compound of the present invention also provides a compound that allows it to easily fill the light waveguide leads and cables during their manufacture. To this end, the filling compound has good flowability that is characterized by a time delayed re-gelling so that, for example, the filling compound can be passed through cables and leads having an inside diameter of between 0.5 and 5 mm with an excess pressure of only a few bars. Because polypropylene glycol is a low-viscosity fluid this facilitates the filling process. The ability to work with low excess pressures in filling the light waveguide leads provides a further advantage of the present invention in that no undesirable mechanical stressings of the light waveguide fibers will arise during the filling of the light waveguide leads.

Moreover, the transparency of the filling compound of the present invention is excellent. It is advantageous in this context to employ an average-molecular weight polypropylene glycol. Preferably, the polypropylene glycol has a molecular weight of between approximately 2000 to about 3500. It has been found that utilizing polypropylene glycols having a molecular weight between approximately 2000 to about 3500 provides a polypropylene glycol having a glass transition temperature of approximately $-40°$ C. and, further, that these polypropylene glycols have an evaporation rate that is lower than that of paraffin oils.

In an embodiment of the present invention, a fumed silic that has been rendered hydrophobic by hydrosiliconization is added to the polypropylene glycols to make the filling compound. The addition of hydrophobic fumed silica provides a filling compound with a low moisture absorption because of the hydrophobic fumed silica's property. It should be noted that fumed silica is hydrophilic; hydrophobization is only produced by additional measures.

If desired, the filling compound can include an antioxidant. The antioxidant will present any potential, unfavorable influence of oxygen, especially atmospheric oxygen, on the polypropylene glycol and/or the thixotropic compound contained in the filling compound. Any antioxidant that dissolves well in polypropylene glycols can be utilized. Examples of antioxidants that can be utilized in the filling compound include: polymeric 2,2,4-trimethyl-1,2-dihydroquiniline; phenothiazine; octadecyl 3-(3,5-di-tert butyl-4-hydroxyphenyl) propionate; and hydroquinone monomethyl ether.

When utilized, preferably the antioxidant comprises approximately 0.1 to about 1 weight percent of the filling compound. Most preferably, the antioxidant comprises approximately 0.1 to about 0.5 weight percent of the filling compound.

In another embodiment of the invention, the finely distributed fumed silica is replaced either entirely, or in part, by identical weight percentages of aluminum oxide or aluminum hydroxide. These filling compounds have the additional advantage that they are fire-inhibiting. In certian applications of optical cables this characteristic can be of great importance.

In another embodiment of the filling compound of this invention, the fumed silica is replaced either entirely, or in part, by a halogen-containing organic compound. A filling compound comprising polypropylene glycol and a halogen containing organic compound has the advantage that a highly nonflammable compound can be achieved given retention of the moisture stability. Preferably a bromine-containing compound is utilized; most preferably, decabromodiphenyl ether is utilized in combination with antimony trioxide, if desired.

When the fumed silica is substituted for by aluminum oxide, aluminum hydroxide, or a halogen containing compound, the advantageous properties afforded the filling compound by the addition of polypropylene glycol remain largely unchanged, only the thixotroping properties are reduced by the substitution.

By way of example, and not limitation, examples of the filling compound of the present invention will be set forth:

EXAMPLE 1

A light waveguide lead filling compound which contains the following constituents was produced as follows:

| Constituents | Weight Parts |
| --- | --- |
| polypropylene glycol | 97.1 |
| hydrophilic fumed silica | 2.5 |
| antioxidants | 0.4 |

The above constituents were well-mixed in a ball mill at 80° C. As soon as a uniform mixture was obtained, the compound was taken from the mill, and was cooled to room temperature and deaerated.

EXAMPLE 2

Utilizing the procedure set forth Example 1, a light waveguide lead filling compound was produced utilizing the following constituents:

| Constituents | Weight Parts |
| --- | --- |
| polypropylene glycol | 96.1 |
| hydrophilic fumed silica | 2.0 |
| hydrophobic fumed silica | 1.5 |
| antioxidants | 0.4 |

EXAMPLE 3

A light waveguide core filling compound which contains the following constituents was produced as follows:

| Constituents | Weight Parts |
| --- | --- |
| polypropylene glycol | 91.6 |
| hydrophobic fumed silica | 8 |
| antioxidants | 0.4 |

By way of example, the following commercially available constituents have been found to function satisfactory to produce the filling compound of this invention. The hydrophilic fumed silica can be purchased from Degussa Co. under the trade name "Aerosil 380"; the hydrophobic fumed silica can be purchased from the Wacker Chemical Co. under the name of "HDK 20"; The polypropylene glycol can be "B01/300" purchased from the Hoechst Co. and the antioxidant can be "Irganox 1076" purchased from Ciba-Geigy.

EXAMPLE 4

A light waveguide core filling compound that contains the following constituents was produced:

| Constituents | Weight Parts |
| --- | --- |
| polypropylene glycol | 74.6 |
| basic aluminum oxide | 25.0 |
| antioxidants | 0.4 |

EXAMPLE 5

A light waveguide core filling compound which contains the following constituents was produced:

| Constituents | Weight Parts |
| --- | --- |
| polypropylene glycol | 74.6 |
| $Al(OH)_3$ | 15 |
| hydrophobic fumed silica | 10 |
| antioxidants | 0.4 |

The filling compounds of Examples 4 and 5 are fire-inhibiting; the compound of Example 4 is softer than that of Example 5.

Referring now to the figures, FIG. 1 illustrates a crossectional view of a filled light waveguide lead GA. As illustrated, the light waveguide lead GA includes at least one light waveguide fiber LW. The light waveguide fiber LW is surrounded by a coating CT. A protective sheath SH, which comprises an extruded plastic, covers the outside of light waveguide lead GA. Located between the protective sheath SH and coating CT is a filling compound FC. the filling compound FC is the filling compound of the present invention set forth in detail above.

The filling compound FC should, on the one hand, be sufficiently soft in order to avoid mechanical stresssing of the light waveguide fiber LW during bending. However, on the other hand, the filling compound FC should be so stable that the filling compound does not flow-out or drip-out out of the light waveguide lead at high temperatures. In the preferred embodiment illustrated, i.e., as a light waveguide lead filling compound, preferably the filling compound FC comprises between approximately 1 to about 4 weight percent finely distributed fumed silica and between approximately 99 to about 96 weight percent polypropylene glycol.

Figure 2:
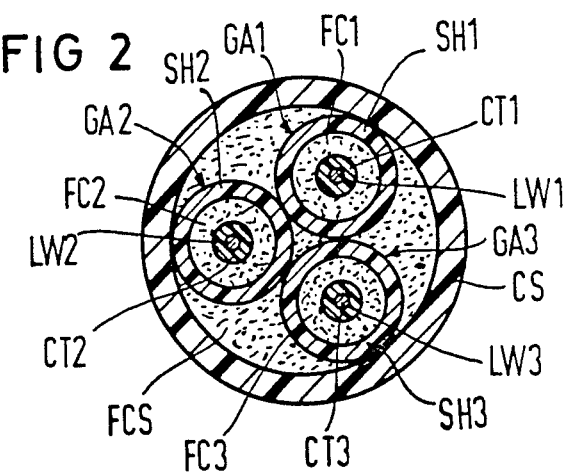
FIG. 2 illustrates a cross-sectional view of three filled light waveguide leads located in a light waveguide cable of the present invention.

Referring to FIG. 2, another embodiment of the present invention is illustrated. As illustrated, three light waveguide leads GA1, GA2 and GA3 (having the structure described in FIG. 1 above) are arranged inside a light waveguide cable casing CS. The core filling compound FCS of this arrangement lies between the outside surfaces of the protective sheath SH of the light waveguide leads GA1, GA2, GA3 and the inside surface of the cable casing CS.

Preferably, in this embodiment i.e., as a light waveguide cable core filler, the filling compound FCS comprises between approximately 92 to about 50 weight percent polypropylene glycol and between approximately 8 to about 50 weight percent of finely distributed fumed silica. The core filling compounds FCS are always to be selected somewhat more tenacious than the lead filling compounds FC whose properties can have a direct influence (via the fiber coating CT) on the light waveguide fiber LW.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim as my invention:

1. A light waveguide cable containing waveguide leads with a cable core filling compound between the outside surfaces of said waveguide leads and the inside surface of a casing for the cable, said core filling compound consisting essentially of:
- 92 to about 50 weight percent of polypropylene glycol; and
- 8 to about 50 weight percent of a finely distributed fumed silica, the agglomerates of the fumed silica having a size of less than 10 microns.

2. The filing compound of claim 1 wherein the molecular weight of the polyproylene glycol is between approximately 2000 to about 3500.

3. A filling compound for a light waveguide lead, containing at least one fiber in a sheath formed by an extruded plastic, said filling compound being located between said sheath and coated light waveguide fiber, said filling compound consisting essentially of:
- 99 to about 96 weight percent of polypropylene glycol; and
- 1 to about 4 weight percent of a finely distributed fumed silica, the agglomerates of the fumed silica having a size of less than 10 microns.

4. The filling compound of claim 3 wherein the molecular weight of the polypropylene glycol is between approximately 2000 to about 3500.

5. A light waveguide cable containing waveguide leads with a cable core filling compound between the outside surfaces of said waveguide leads and the inside surface of a casing for the cable, said core filling compound consisting essentially of:
- 92 to about 50 weight percent of a finely distributed fumed silica, the agglomerates of the fumed silica having a size of less than 10 microns; and
- an antioxidant.

6. The filling compound of claim 5 wherein the antioxidant is chosen from the group consisting of: polymeric 2, 2, 4-trimethyl-1, 2-dihydroquiniline; phenothiazine; octadecyl 3-(3,5-di-tert butyl-4-hydroxyphenyl) propionate; and hydroquinone monomethyl ether.

7. A filling compound for a light waveguide lead and light waveguide cable consisting essentially of:
- polypropylene glycol; and
- a thixotroping agent comprising finely distributed fumed silica.

8. The filling compound of claim 7 wherein the average molecular weight of polypropylene glycol is between approximately 2000 to about 3500.

9. The filling compound of claim 7 herein the fumed silica is hydrophillic.

10. The filling compound of claim 9 wherein the fumed silica has been rendered hydrophobic.

11. The filling compound of claim 7 wherein: approximately 50 to about 99 percent by weight of the filling compound is polypropylene glycol; and approximately 1 to about 50 weight percent of the filling compound is fumed silica.

12. The filling compound of claim 11 including an antioxidant.

13. The filling compound of claim 7 wherein the fumed silica aggolemerates have a size of less than 10 microns.

14. A filling compound for a light waveguide lead and light waveguide cable comprising:
- from 50 to about 99 percent of polypropylene glycol;
- from 50 to about 1 weight percent of a second constituent chosen from the group consisting of hydrophilic fumed silica; hydrophobic fumed silica; hydrophilic and hydrophilic silicic acid; aluminum hydroxide; aluminum oxide; aluminum hydroxide and silicic acid; and aluminum oxide and cilicic acid; and
- the filling compound not including a gas-containing inorganic oxide material.

15. The filling compound of claim 14 including approximately 0.1 to about 1 weight percent of an antioxidant chosen from the group consisting of: polymeric 2,2,4-trimethyl-1, 2-dihydroquiniline; phenothiazine; octadecyl 3-(3, 5-di-tert butyl-4-hydroxyphenyl) propionate; and hydroquinone monomethyl ether.

16. The filling compound of claim 14 wherein the polypropylene glycol has an average molecular weight of approximately 2000 to about 3500.

17. The filling compound of claim 14 wherein when fumed silica is chosen and the aggolmerates of the fumed silica have a size of less than 10 microns.

18. A filling compound for a light waveguide cable consisting essentially of:
- 92 to about 50 weight percent of polypropylene glycol; and
- 8 to 50 weight percent of a finely distributed fumed silica.

19. A filling compound for a light waveguide lead consisting essentially of:
- 99 to about 96 weight percent of polypropylene glycol; and
- 1 to about 4 weight percent of finely distributed fumed silica.

20. A filling compound for a light waveguide lead containing at least one fiber in a sheath formed by an extruded plastic, said filling compound being located between said sheath and coated light waveguide fiber, said filling compound consisting essentially of:
- 99 to about 96 weight percent of polypropylene glycol;
- 1 to about 4 weight percent of a finely distributed fumed silica, the agglomerates of the fumed silica having a size of less than 10 microns; and
- an antioxidant.

* * * * *